United States Patent
Haddad et al.

(10) Patent No.: US 9,173,117 B2
(45) Date of Patent: Oct. 27, 2015

(54) ENHANCING A MOBILE BACKUP CHANNEL TO ADDRESS A NODE FAILURE IN A WIRELINE NETWORK

(71) Applicant: TELEFONAKTIEBOLAGET L M ERICSSON (PUBL), Stockholm (SE)

(72) Inventors: Wassim Haddad, San Jose, CA (US); Joel Halpern, Leesburg, VA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 335 days.

(21) Appl. No.: 13/886,081

(22) Filed: May 2, 2013

(65) Prior Publication Data

US 2014/0328161 A1 Nov. 6, 2014

(51) Int. Cl.
| | |
|---|---|
| H04L 12/26 | (2006.01) |
| H04W 24/04 | (2009.01) |
| H04L 12/24 | (2006.01) |
| H04L 12/28 | (2006.01) |
| H04L 29/08 | (2006.01) |
| H04L 12/703 | (2013.01) |
| H04L 29/14 | (2006.01) |

(52) U.S. Cl.
CPC ............ *H04W 24/04* (2013.01); *H04L 12/287* (2013.01); *H04L 41/0668* (2013.01); *H04L 45/28* (2013.01); *H04L 67/1002* (2013.01); *H04L 69/40* (2013.01)

(58) Field of Classification Search
None
See application file for complete search history.

(56) References Cited

U.S. PATENT DOCUMENTS

| | | | | |
|---|---|---|---|---|
| 7,965,719 | B2 * | 6/2011 | Karaoguz et al. | 370/397 |
| 8,971,173 | B1 * | 3/2015 | Choudhury et al. | 370/216 |
| 9,025,439 | B2 * | 5/2015 | Haddad et al. | 370/217 |
| 2005/0174935 | A1 * | 8/2005 | Segel | 370/228 |
| 2010/0002578 | A1 * | 1/2010 | Fiorone et al. | 370/228 |
| 2010/0309784 | A1 * | 12/2010 | Mihaly et al. | 370/230 |
| 2012/0011274 | A1 * | 1/2012 | Moreman | 709/238 |
| 2012/0236708 | A1 * | 9/2012 | Kompella et al. | 370/220 |
| 2014/0177434 | A1 * | 6/2014 | Cartmell et al. | 370/221 |
| 2014/0204730 | A1 * | 7/2014 | Sampath et al. | 370/220 |

(Continued)

FOREIGN PATENT DOCUMENTS

WO WO-2008043374 4/2008

OTHER PUBLICATIONS

"TR-203 Interworking between Next Generation Fixed and 3GPP Wireless Networks", Aug. 1, 2012, 68 pages, Issue 1, *The Broadband Forum*.

*Primary Examiner* — Timothy J Weidner
*Assistant Examiner* — Jana Blust
(74) *Attorney, Agent, or Firm* — Nicholson De Vos Webster & Elliott, LLP

(57) ABSTRACT

A method performed by a slave network edge node (e.g., a Broadband Network Gateway BNG2) for enhancing a Long Term Evolution (LTE) backup channel in the event of a failure of a master network edge node (e.g., BNG1) in a wireline network. When BNG2 detects the failure of BNG1, BNG2 sends a failure update message to a Packet Data Network Gateway (PDN GW) of an LTE network. The PDN GW provides a backup channel for the CPE to reach the wide area network over a mobile tunnel. Before the failure the mobile tunnel has an end point at BNG1, and the failure update message notifies the PDN GW that the end point of the mobile tunnel has changed from BNG1 to BNG2. After BNG2 receives a failure acknowledgement message from the PDN GW, BNG2 routes the traffic from the PDN GW over the mobile tunnel to the wide area network.

25 Claims, 7 Drawing Sheets

(56) References Cited

U.S. PATENT DOCUMENTS

| | | | |
|---|---|---|---|
| 2014/0226642 A1* | 8/2014 | Haddad et al. | 370/338 |
| 2015/0109901 A1* | 4/2015 | Tan et al. | 370/218 |
| 2015/0124585 A1* | 5/2015 | Sahin et al. | H04L 45/28 |

* cited by examiner

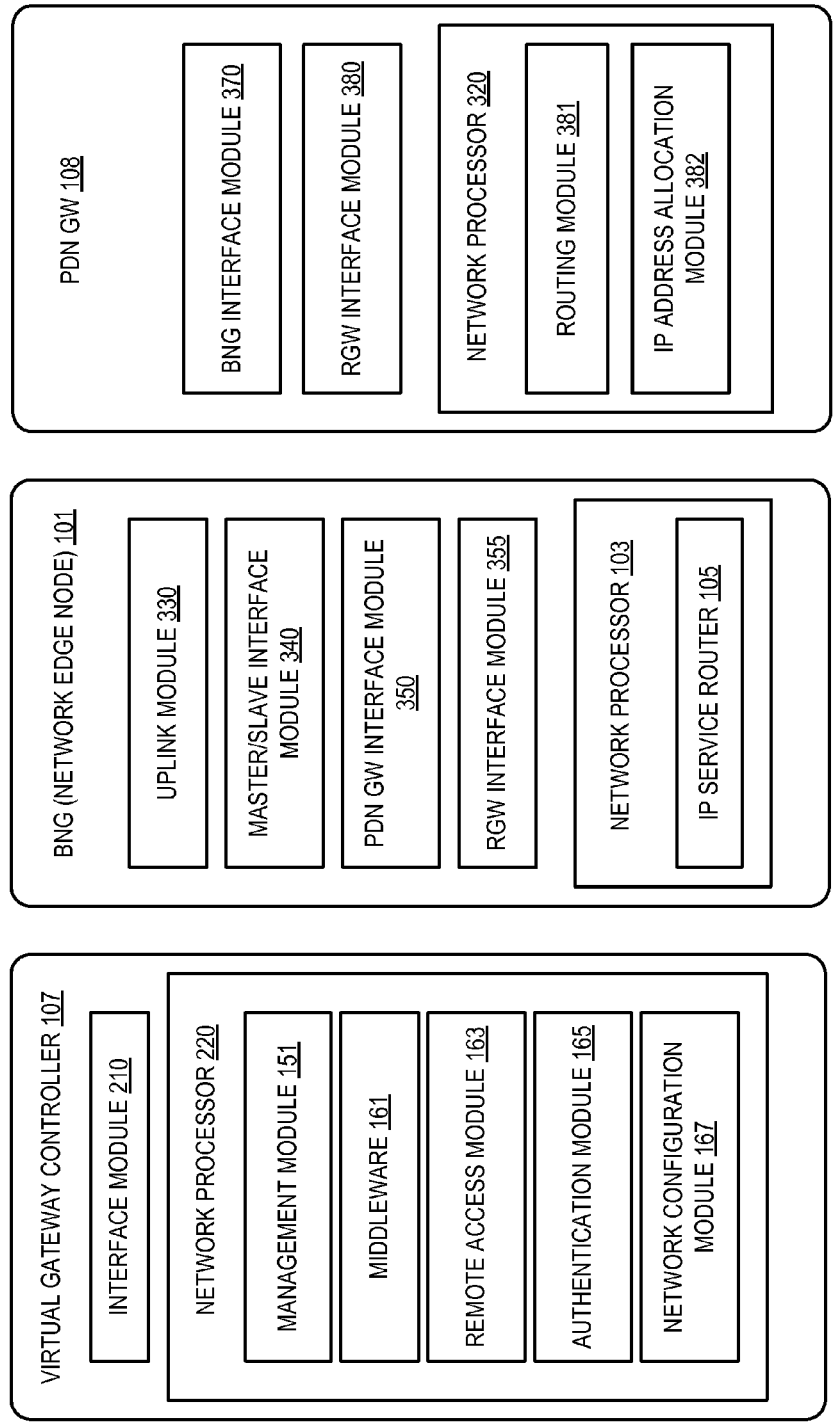

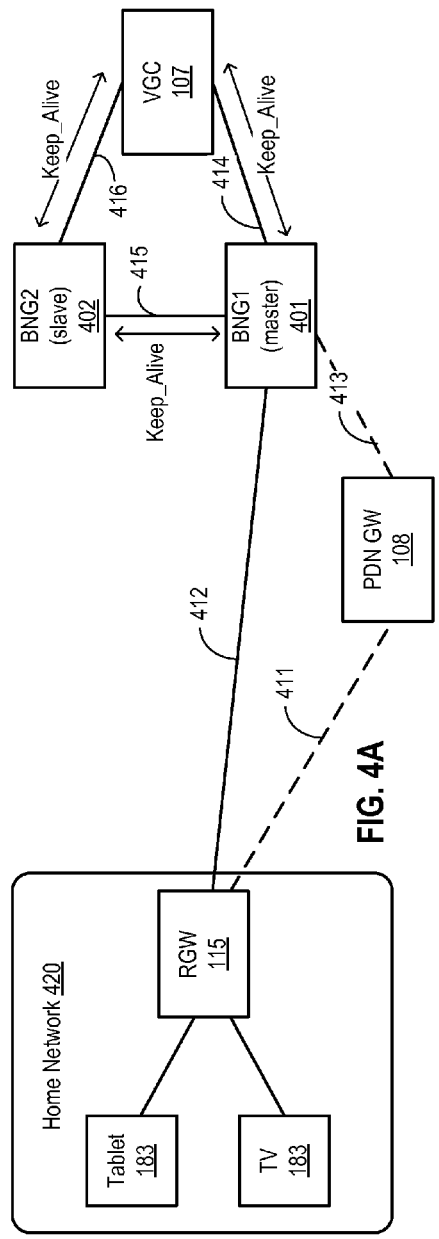
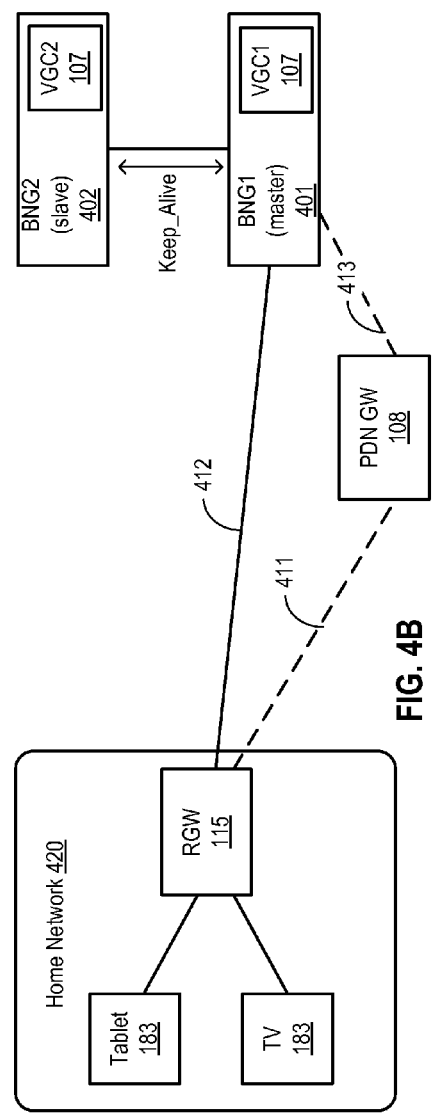
FIG. 4A
FIG. 4B

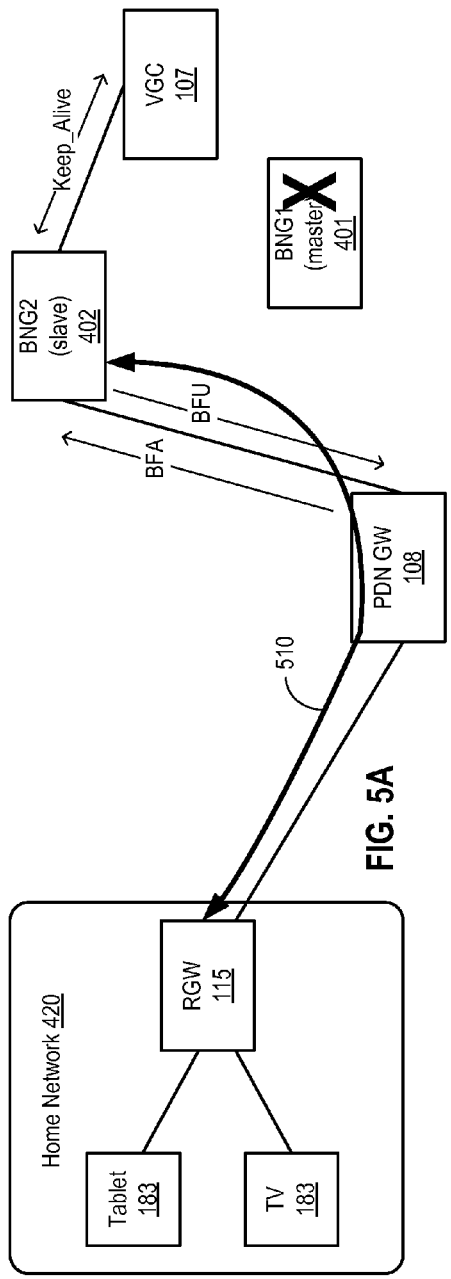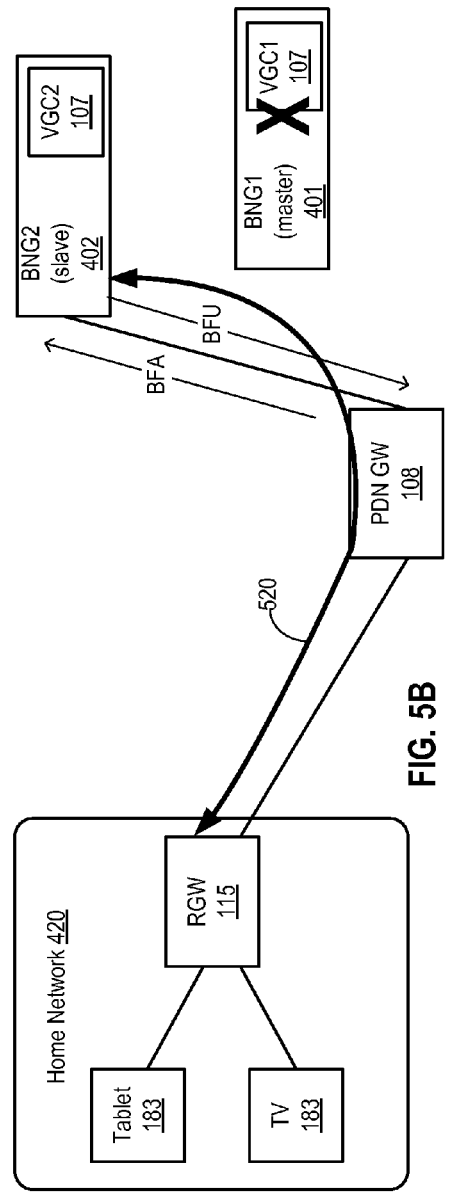

ENHANCING A MOBILE BACKUP CHANNEL TO ADDRESS A NODE FAILURE IN A WIRELINE NETWORK

FIELD OF INVENTION

The embodiments of the invention are related to the field of network failure recovery. More specifically, the embodiments of the invention relate to a method and system for enabling traffic re-routing upon node failure in a wireline network.

BACKGROUND

Home networks are utilized to connect devices in the home to one another and to the Internet. These home networks are connected to residential Internet service providers via a device known as a Residential Gateway (RGW). This device provides physical and protocol connectivity between the home network and the access network (i.e., the core network of the Internet service provider including the Internet service provider's access control devices such as a Broadband Remote Access Server (BRAS) router or Broadband Network Gateway (BNG)). In this specification, BRAS and BNG are used interchangeably.

An RGW can provide bridging or routing support for a home network. It typically also provides additional services such as firewall protection and network address translation. The RGW can connect with the devices in a home using both wired and wireless protocols and connections. The RGW can provide a set of Ethernet connections as well as a wireless local area network using IEEE 802.11(a/b/g/n). The RGW can also be a point of service delivery for services such as Voice Over Internet Protocol (VOIP) or de-multiplexing for services like shared television delivery.

An Internet service provider's access control device such as a BNG is also called a network edge device. The BNG is a critical network element for providing Internet services for home networks. The failure of the BNG will make devices in the home networks unreachable by the Internet service provider.

SUMMARY

In one embodiment, a method is implemented by a slave network edge node at an edge of a service provider network for enhancing a Long Term Evolution (LTE) backup channel in the event of a node failure in a wireline network. The slave network edge node provides accessibility to a wide area network for a customer premise equipment (CPE) upon a failure of a master network edge node. The master network edge node is coupled to the CPE over a wireline link and provides accessibility to the wide area network for the CPE before the failure. The method comprises detecting that the master network edge node has failed; sending a failure update message by the slave network edge node to a Packet Data Network Gateway (PDN GW) of an LTE network. The PDN GW provides a backup channel for the CPE to reach the wide area network over a mobile tunnel. Before the failure the mobile tunnel has an end point at the master network edge node. The failure update message notifies the PDN GW that the end point of the mobile tunnel has changed from the master network edge node to the slave network edge node. The method further comprises receiving a failure acknowledgement message (BFA) by the slave network edge node from the PDN GW in response to the failure update message; and routing traffic received by the slave network edge node from the PDN GW over the mobile tunnel to the wide area network.

In one embodiment, a network element serves as a slave network edge node at an edge of a service provider network. The network element provides accessibility to a wide area network for a CPE upon a failure of a master network edge node. The master network edge node is coupled to the CPE over a wireline link and provides accessibility to the wide area network for the CPE before the failure. The network element comprises an uplink module to communicate with the wide area network; a master/slave interface module to communicate with the master network edge node; a PDN GW interface module to communicate with a PDN GW of an LTE network. The PDN GW provides a backup channel for the CPE to reach the wide area network over a mobile tunnel. Before the failure the mobile tunnel has an end point at the master network edge node. The network element further comprises a network processor communicatively coupled to the uplink module, the master/slave interface module, and the PDN GW interface module, the network processor adapted to detect that the master network edge node has failed; send a BFU message to the PDN GW notifying the PDN GW that the end point of the mobile tunnel has changed from the master network edge node to the slave network edge node. The network processor is further adapted to receive a BFA message from the PDN GW in response to the BFU message, and route traffic received from the PDN GW over the mobile tunnel to the wide area network.

In one embodiment, a network element serves as a slave Broadband Network Gateway (BNG) at an edge of a service provider network. The network element provides accessibility to a wide area network for a Residential Gateway (RGW) upon a failure of a master BNG. The master BNG is coupled to the RGW over a wireline link and provides accessibility to the wide area network for the RGW before the failure. The network element comprises an uplink module to communicate with the wide area network; a master/slave interface module to communicate with the master BNG; a PDN GW interface module to communicate with a PDN GW of an LTE network. The PDN GW provides a backup channel for the RGW to reach the wide area network over a mobile tunnel. Before the failure the mobile tunnel has an end point at the master BNG. The network element further comprises a network processor communicatively coupled to the uplink module, the master/slave interface module, and the PDN GW interface module, the network processor adapted to detect that the master BNG has failed; send a BFU message to the PDN GW notifying the PDN GW that the end point of the mobile tunnel has changed from the master BNG to the slave BNG. The network processor is further adapted to receive a BFA message from the PDN GW in response to the BFU message, and route traffic received from the PDN GW over the mobile tunnel to the wide area network.

In one embodiment, a method is implemented by a first network edge node at an edge of a service provider network for dynamically balancing network traffic load among a plurality of peer network edge nodes. The first network edge node provides accessibility to a wide area network for a CPE. The method comprising detecting traffic overload at the first network edge node; sending a first traffic offload request (TOR) by the first network edge node to a peer network edge node. The first traffic offload request includes a range of prefixes to be offloaded to the peer network edge node, such that network traffic identifying an address within the range is to be routed by a PDN GW of an LTE network to the peer network edge node instead of the first network edge node. The PDN GW provides a backup channel for the CPE to reach the wide area network over a mobile tunnel. The method further comprises receiving a first traffic offload acknowledgement (TOA) from the peer network edge node.

In one embodiment, a network element serves as a first network edge node at an edge of a service provider network for dynamically balancing network traffic load among a plurality of peer network edge nodes. The first network edge node provides accessibility to a wide area network for a CPE. The network element comprises an uplink module to communicate with the wide area network; a BNG interface module to communicate with the peer network edge nodes; a PDN GW interface module to communicate with a PDN GW of an LTE network, wherein the PDN GW provides a backup channel for the RGW to reach the wide area network over a mobile tunnel; and a network processor communicatively coupled to the uplink module, the BNG interface module, and the PDN GW interface module. The network processor is adapted to detect traffic overload at the first network edge node, and to send a first TOR message by the first network edge node to a peer network edge node. The first TOR message includes a range of prefixes to be offloaded to the peer network edge node, such that network traffic identifying an address within the range is to be routed by the PDN GW to the peer network edge node instead of the first network edge node. The network processor is further adapted to receive a first TOA message from the peer network edge node.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 2 is a block diagram illustrating one embodiment of a virtual gateway controller.

FIG. 3A is a block diagram illustrating one embodiment of a BNG.

FIG. 3B is a block diagram illustrating one embodiment of a PDN GW.

FIG. 4A is a diagram illustrating a first network operation scenario.

FIG. 4B is a diagram illustrating a second network operation scenario.

FIG. 5A is a diagram illustrating a first network failure scenario.

FIG. 5B is a diagram illustrating a second network failure scenario.

DETAILED DESCRIPTION

Figure 1:
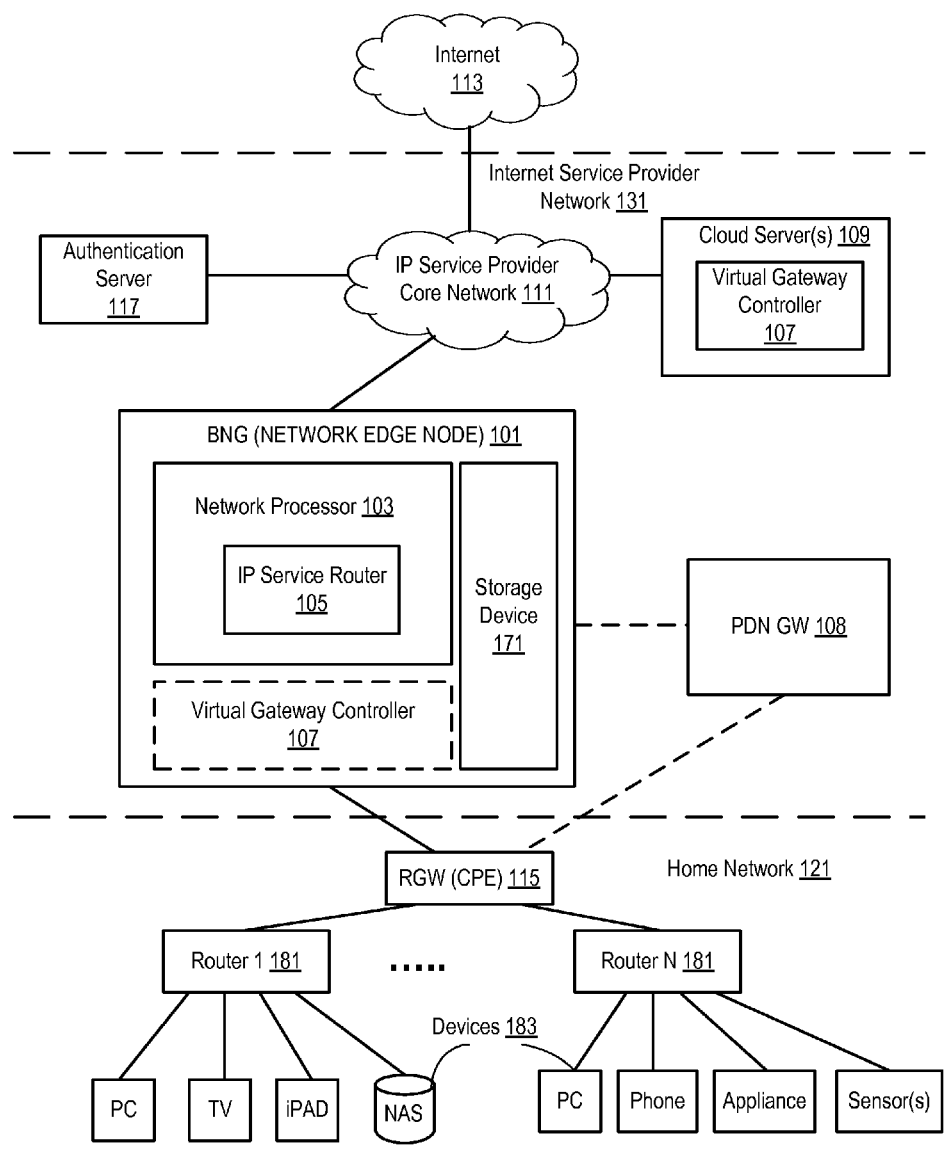
FIG. 1 is a block diagram illustrating one embodiment of a network configuration.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element or network node (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, the term "customer premise" refers to both residential and business premises. Although the terms "home network," "residential gateway" and "residential router" are used in the following description, it is understood that the embodiments of the invention are applicable to any customer premise networks and devices.

A residential gateway (RGW) is a critical part of a customer premise network as it provides connectivity of customer premise devices to the Internet. An RGW provides physical and protocol connectivity between the home network and an access network of a residential Internet service provider through its connection to a broadband network gateway (BNG) of the access network. The BNG is a network edge node that provides wireline connectivity to the RGW. When the BNG and/or a controller of the BNG fails, home devices connecting to the RGW become unreachable to the Internet through the wireline network. Thus, it is desirable to have a backup mechanism to allow the Internet service provider to reach home networks in case of a failure in the BNG and/or a controller of the BNG.

Long Term Evolution (LTE) is a standard for mobile communication of high-speed data. LTE has redesigned and simplified mobile network architecture to an IP-based system. The LTE specification provides downlink peak rates of 300 Mbits/s, uplink peak rate of 75 Mbits/s and QoS provisions permitting a transfer latency of less than 5 ms. With high bandwidth and low latency, LTE supports video, data as well as voice through VOIP. In an LTE system, a Packet Data Network (PDN) Gateway (PDN GW) provides wireless connectivity between a user equipment (UE) and an external packet data network. A PDN GW acts as the point of entry and exit for traffic to the UE. Apart from controlling IP data services, a PDN GW also does routing, allocates IP addresses, provides access for non-LTE network and even enforces policy.

As LTE networks being rolling out, the trend is for home networks to have access to LTE networks. Some telecommunication equipment manufacturers have started to implement RGW with LTE capabilities. For example, an RGW model with an LTE interface has been deployed by Vodafone in the United Kingdom. The existence of RGWs with interfaces connecting with both a wireline network through a BNG and a mobile network through a PDN GW allows a network operator to mitigate the impact of failure in the wireline network.

The embodiments of the invention provide a method and system for avoiding the disadvantages of the prior art. The embodiments of the invention provide updates to an LTE network upon a wireline node failure so that PDN GW can have the correct information for setting up a backup channel and re-route traffic through an LTE network upon the wireline node failure. After the wireline node restores, the RGW and the BNG may halt traffic re-routing and use the wireline for traffic routing. Examples of the wireline node include a BNG and a controller of the BNG. The controller may reside within the BNG, or external and coupled to the BNG. In one embodiment, the controller is a virtual gateway controller described below with reference to FIG. 1.

FIG. 1 is a diagram of a network architecture using a virtual gateway controller to support virtualized visibility for residential routers, according to one embodiment. The implementation of the virtualized visibility is divided amongst three primary components, and several related items. The three primary components are the residential gateway (RGW) 115, the upstream IP Service router 105 (i.e., in a BNG 101, BRAS or equivalent), and the virtual gateway controller 107.

A BNG 101 is an Internet Protocol (IP) network edge router where bandwidth and Quality of Service (QoS) policies are applied; the functions performed by a BRAS are a superset of those performed by a BNG. A BRAS is a BNG 101 and is the aggregation point for the subscriber traffic. It provides aggregation capabilities (e.g. IP, Point-to-Point Protocol (PPP), Ethernet) between the access network and the core network 111 of the Internet service provider network 131. Beyond its aggregation function, the BRAS is also an injection point for policy management and IP QoS in the access network. For sake of clarity, an example of a network using a BNG 101 to implement the IP services router 105 is provided. However, one skilled in the art would understand that a BRAS or similar device could also be used. An Internet service provider network 131 with a single BNG 101 and RGW 115 is illustrated also for sake of clarity. One skilled in the art would understand that a BNG 101 can connect any number of home networks 121 and RGWs 115 to the core network 111 as well as to the general Internet 113. Also, the Internet service provider 131 can include any number of BNG 101 and BRAS or similar devices to connect to the set of home networks 121 and RGWs 115.

A virtual gateway controller 107 can be implemented in multiple fashions. In one embodiment, the virtual gateway controller 107 can be part of the control plane of the IP services router 105, which is executed by a network processor 103 of a BNG or similar device. The virtual gateway controller 107 can be delivered on a blade in the chassis of the IP services router 105 (e.g., in a BNG 101). Alternatively, the virtual gateway controller 107 may reside in one or more server computers (e.g., cloud servers 109) coupled to the BNG 101 via the core network 111. The virtual gateway controller 107 is responsible for maintaining the subscribers' virtual operation state, which includes determining the operational state of all data plane functions. This means both modeling the state and configuring the appropriate devices such as RGW 115 and BNG 101 to deliver the behavior needed.

The IP services router 105 is the router which delivers data plane services for the subscriber. It handles all subscriber data plane packets. It performs many of the functions, such as network address translation (NAT) and firewall functions, which are functions that are traditionally delivered by RGW 115. The IP services router 105 also performs data plane functions such as traffic policing and QoS delivery. The operation of these functions is controlled by the virtual gateway controller 107. In one embodiment, the IP services router 105 is coupled to a storage device 171 that stores the tables, data structures, or data for the NAT, QoS policies, firewall configuration and IPv6 information for home network devices 183.

RGW 115 provides the physical connectivity between the various media in the home (Ethernet, 802.11 b/g/n Wifi, Zigbee, and similar media) and connectivity to the service provider (DSL, Cable, Passive Optical, LTE, and similar technologies). RGW 115 provides enough logical operation that it can provide packet communication between home network devices 183 and the IP service provider network 131. RGW 115 can be owned by either the subscriber or the operator. However, it is controlled by the virtual gateway controller 107 managed by the operator.

The home network devices 183 can use network protocols to interact with the virtual gateway controller 107. Examples of the home network devices 183 include PC, TV, tablet computer, Network Attached Storage (NAS), phone, appliance, sensor, etc. In some embodiments, the home network devices 183 may be coupled to RGW 115 via one or more home routers 181. The shift of the functionality from RGW 115 to the virtual gateway controller 107 improves the manageability and effectiveness of operation. This shift leaves the interaction within the home network devices unchanged. For example, a device (e.g., a PC) in the home network 121 can use the UPnP protocol to reach the virtual gateway controller 107 in order to discover a storage service (e.g., a NAS) in the home network 121, which previously was entirely implemented within the home network 121. With the use of the virtual gateway controller 107, UPnP and other services including the DNS, Dynamic Host Configuration Protocol (DHCP), SSID configuration, multicast configuration and similar services appear to be implemented in the home network 121 or at RGW 115, but are actually implemented in and deliverable by the Internet service operator from the virtual gateway controller 107. The use of the split architecture where the control plane of the virtual gateway controller 107 is separated from the data plane of RGW 115 makes the services of the Internet service provider network 131 appear easily discoverable and transparently accessible to the user. Such services can include voice-over-IP (VOIP) enablement services, storage services, or application services. Similarly, access to the home network 121 and home network based services can be more easily provided to users when they are accessing the home network from other networks using additional software for authentication and association, such as an authentication server 117 provided by the Internet service provider.

This network architecture provides a coherent system for a virtualized residential gateway and virtualized home service delivery. The configuration, enhancement, and consistent remote service and remote access to home information and resources all become natural parts of a coherent architecture. An important advantage of this architecture is to provide the operator enough visibility to all devices connected to the residential gateway in the home network 121. This enables the Internet service provider to provide different (seamless) services to the home, e.g., network management, service delivery, and similar services. Another advantage is to enable the Internet service provider to assist third parties, e.g., utility providers or appliance manufacturers, in accessing the right devices through the home network 121. For example, an electric utility company may need to access the home network 121 to configure the thermostat or switch on/off a particular device in the electrical system of the home. In one embodiment, this can be done through a machine to machine middleware (e.g., a middleware 161 shown in FIG. 2) in the virtual gateway controller 107 or an instance thereof.

FIG. 2 is a block diagram illustrating an embodiment of the virtual gateway controller 107. The virtual gateway controller 107 includes an interface module 210 responsible for communicating with other network nodes; e.g., BNGs and/or other virtual gateway controllers. The virtual gateway controller 107 also includes a network processor 220 which includes or coupled to a number of function modules. The network processor 220 may include one or more general purpose processors or one or more special purpose processors. In one embodiment, one of the function modules is a management module 151 responsible for configuring firewall functions on the BNG 101. The management module 151 is also responsible for configuring network parameters (e.g., Service Set Identifiers (SSIDs)) and their policies for wireless access on RGW 115. The management module 151 is also responsible for managing multicast filters on both BNG 101 and RGW 115 so as to provide needed connectivity while reducing unnecessary traffic. The virtual gateway controller 107 can also provide home control functions such as the Universal Plug and Play (UPnP) protocol control. It can provide supporting services such as creating Domain Name System (DNS) entries and supporting the DHCP. The operation of the virtual gateway controller 107 is tied in to the existing authorization infrastructure 117 used by the Internet service provider (e.g., RADIUS and/or Diameter). This enables additional authorization operations, such as those needed for Fixed-Mobile Convergence, or for support of Subscriber Identity Module (SIM) based residential gateways.

In one embodiment, the virtual gateway controller 107 also includes a remote access module 163, an authentication module 165, a network configuration module 167 and similar components. The components facilitate the management of the home network 121 by the owner of the home network or any user associated with an account of the owner of the home network. For sake of clarity, a home network owner refers to any individual with administrative authority for the home network 121. A home network user refers to an individual using a computing device or host 183 connected to the home network 121.

The remote access module 163 provides access to resources from remote home networks to visiting user devices. The remote access module 163 can establish a separate virtual local area network (VLAN) or SSID for providing access to the remote network resources. The remote access module 163 can also communicate with a virtual gateway controller of the remote home network to obtain configuration information for the remote home network and the information needed to access resources on the remote home network. The remote access module 163 can work with the authentication module 165 to authenticate visiting user devices on the home network 121 to enable the visiting user devices to access resources of the home network 121. The authentication module 165 can also facilitate the authentication of the visiting user device for establishing a connection to the remote home network.

The network configuration module 167 can provide a user interface to enable a home network owner to alter the configuration of the home network. The network configuration module 167 can provide a web-based interface, can interact with a local client of host devices 183 or similarly enable the home network owner to access the configuration interface. In instances where visiting users are requesting to access or share local or remote home network resources, the home network owner can be notified of the request and enabled to approve or refuse the request using an interface provided by the network configuration module 167.

FIGS. 3A and 3B illustrate two network elements serving as a BNG and a PDN GW respectively. In one embodiment, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card can be used to terminate IPsec tunnels and execute the attendant authentication and encryption algorithms.

FIG. 3A is a block diagram illustrating an embodiment of the BNG 101. In this embodiment, the BNG 101 includes an uplink module 330 that manages connectivity to an uplink network element (e.g., a router) so that BNG 101 can reach Internet to communicate with a wide area network (e.g., a service provider's core network or the Internet). The BNG 101 also includes a BNG interface module 340 (also referred to as master/slave interface module 340) to communicate with other BNGs, a PDN GW interface module 350 that manages connectivity to a PDN GW so that BNG 101 can communicate to an LTE network. The BNG 101 also includes an RGW interface module 355 that manages connectivity to a wireline downlink network element for communication with downlink network elements (e.g., RGWs). As described in connection with FIG. 1, the BNG 101 also includes the network processor 103 and the IP service router 105. In an embodiment where the virtual gateway controller 107 resides outside of the BNG 101, the BNG 101 can also include a controller interface module to communicate with the virtual gateway controller 107.

The network processor 103 is a critical part of the BNG 101 which performs re-route among other functions. The network processor 103 manages connectivity status of connections between the BNG 101 and other network elements (e.g., uplink network elements, RGWs, other BNGs and PDN GWs). The network processor 103 decides whether or not to initiate traffic re-routing. In one embodiment, the re-routing decision is not made at the RGW, but at the BNG instead. The centralized decision-making facilitates management of the re-routing process by an Internet service provider. Traffic between the BNG 101 and an RGW can be tunneled through a PDN GW and it can also be passed through a PDN GW. The network processor 103 may include one or more general purpose processors or one or more special purpose processors.

FIG. 3B is a block diagram illustrating an embodiment of PDN GW 108. In this embodiment, PDN GW 108 includes a BNG interface module 370 to communicate with BNGs, an RGW interface module 380 to communicate with RGWs. PDN GW 108 also includes a network processor 320, which executes the functions of a routing module 381 and an IP address allocation module 382. The network processor 220 may include one or more general purpose processors or one or more special purpose processors.

FIG. 4A is a diagram illustrating a network configuration in normal operation according to one embodiment. In this embodiment, the virtual gateway controller 107 is located in cloud servers outside of BNGs. In a home network 420, there is RGW 115 connecting to home devices 183 (e.g., a tablet and a TV) in the network. Home devices 183 communicate with RGW 115, which routes traffic to a BNG 401 (also referred to as "BNG1" or a "master BNG") through a wireline 412 to enable communication with other devices over a wide area network such as the Internet. BNG1 exchanges data with the virtual gateway controller 107 via a link 414. BNG1 is also coupled to a BNG 402 (also referred to as "BNG2" or a "slave BNG"). BNG1 and BNG2 may be implemented by the BNG 101 of FIG. 1 and FIG. 3A.

When the link 414 fails, the data exchanges between BNG1 and the virtual gateway controller 107 can go through BNG2 via links 415 and 416. During normal operation, BNG1 exchanges keep_alive messages with BNG2 periodically. Additionally, both BNG1 and BNG2 exchanges keep_alive messages with the virtual gateway controller 107 periodically. An absence of the keep_alive message indicates that the sender of the message has failed. The keep_alive messages are used by BNG1, BNG2 and the virtual gateway controller 107 to monitor the health of one another such that appropriate measures can be taken when any of them fails.

In one embodiment, RGW 115 has an LTE interface. With the LTE interface, RGW 115 can communicate with an LTE network through a PDN GW (e.g., PDN GW 108), which provides connectivity for RGW 115 to a mobile network (also referred to as a "wireless network"). An RGW LTE interface can be preconfigured so it remains in sleeping mode without actively routing traffic. The preconfiguration includes assigning an IPv6 address for the LTE interface so that it can be communicate with other network elements in a LTE network. PDN GW 108 can be pre-configured with parameters such as the IPv6 address of an RGW (e.g., RGW 115) so it can discover the RGW. A PDN GW can communicate not only to an RGW, but also a BNG. A PDN GW can be pre-configured with the required parameters (e.g., a BNG's IPv6 addresses) and it can discover the BNG associated with a particular RGW and establish secure communication. Similarly, a BNG can be pre-configured with the parameters such as a PDN GW's IPv6 addresses so that it can establish a secure communication with a PDN GW. In the example embodiment of FIG. 4A, BNG1 communicates with PDN GW 108 through a mobile link 413. In other embodiments, the links between the BNGs (BNG1 and BNG2) and PDN GW 108 can be partially or wholly wired or similar connections or any combination of wired and wireless connections.

In normal operation, traffic coming in and out of the home network 420 goes through the wireline link 412, and mobile links 411 and 413 do not route traffic. The mobile links 411 and 413 forms a mobile tunnel, which serves as a backup channel for RGW 115 in case the wirelne link 412 fails.

FIG. 4B is a diagram illustrating another network configuration in normal operation according to another embodiment. Similar to the embodiment of FIG. 4A, the home network 420 connects to BNG1 via RGW 115 through a wireline 412, and PDN GW 108 provides a backup channel to RGW 115 via mobile links 411 and 413. However, the virtual gateway controllers 107 (VGC1 and VGC2) in this embodiment reside within the BNGs (BNG1 and BNG2, respectively). For example, VGC1 resides within BNG1 and VGC2 resides within BNG2. BNG1 and BNG2 exchange keep_alive messages periodically. In addition, VGC2 periodically receives the current state of VGC1 such that the state of VGC2 mirrors the state of VGC1. In normal operation, traffic coming in and out of the home network 420 goes through the wireline link 412, and mobile links 411 and 413 do not route traffic. The mobile tunnel formed by mobile links 411 and 413 takes over the traffic routing for RGW 115 when the wirelne link 412 fails or otherwise unavailable.

FIG. 5A is a diagram illustrating a failure scenario when BNG1 fails, according to one embodiment. In the illustrated example, the virtual gateway controller 107 resides outside of BNG1. The failure affects communication such as traffic coming in and going out of RGW 115 and its home devices 183. When BNG1 fails, both BNG2 and the virtual gateway controller 107 can detect the failure from the absence of the keep-alive messages from BNG1. Upon detection of the failure, BNG2 sends a BNG_Failure_Update (BUF) message to PDN GW 108. The BUF message notifies PDN GW 108 that the mobile tunnel between RGW 115 and BNG1 has changed its end point from BNG1 to BNG2 due to the BNG1 failure. In response to the BUF message, PDN GW 108 replies with a BNG_Failure_ACK (BFA) message and proceeds to set up a mobile tunnel 510 between RGW 115 and BNG2. BNG2 also notifies the virtual gateway controller 107 that BNG2 is now taking over the role of BNG1 for passing data between RGW 115 and the virtual gateway controller 107. Upon the failure of BNG1, RGW 115 activates its LTE interface such that inbound and outbound data for RGW 115 can be re-routed through PDN GW 108 via the mobile tunnel 510. Thus, RGW 115 and its home devices 183 can continue to communicate with other devices and nodes over the Internet.

FIG. 5B is a diagram illustrating a failure scenario when BNG1 fails, according to one embodiment. In the illustrated example, the virtual gateway controllers 107 reside within the BNGs. That is, VGC1 resides within BNG1 and VGC2 resides within BNG2. In this scenario, when either BNG1 or VGC1 fails, RGW 115 can no longer reach BNG1 through the wireline connection, thus RGW 115 can no longer communicate with any device over the Internet through the wireline. The failure can be immediately detected by BNG2 due to the absence of the keep-alive message from BNG1. Analogous to the example of FIG. 5A, upon detection of the failure, BNG2 sends a BNG_Failure_Update (BUF) message to PDN GW 108. The BUF message notifies PDN GW 108 that the mobile tunnel between RGW 115 and BNG1 has changed its end point from BNG1 to BNG2 due to the BNG1 failure. In response to the BUF message, PDN GW 108 replies with a BNG_Failure_ACK (BFA) message and proceeds to set up (i.e., configure) a mobile tunnel 520 between RGW 115 and BNG2. The tunnel 520 is configured such that any signaling or data which needs to be exchanged between the two devices will go into the tunnel 520. As VGC2 mirrors the state of VGC1, there is no need to re-configure RGW 115 for transferring control from VGC1 to VGC2. Upon the failure of BNG1, RGW 115 activates its LTE interface such that inbound and outbound data for RGW 115 can be re-routed through PDN GW 108 via the mobile tunnel 520. Thus, RGW 115 and its home devices 183 can continue to communicate with other devices and nodes over the Internet.

Figure 6:
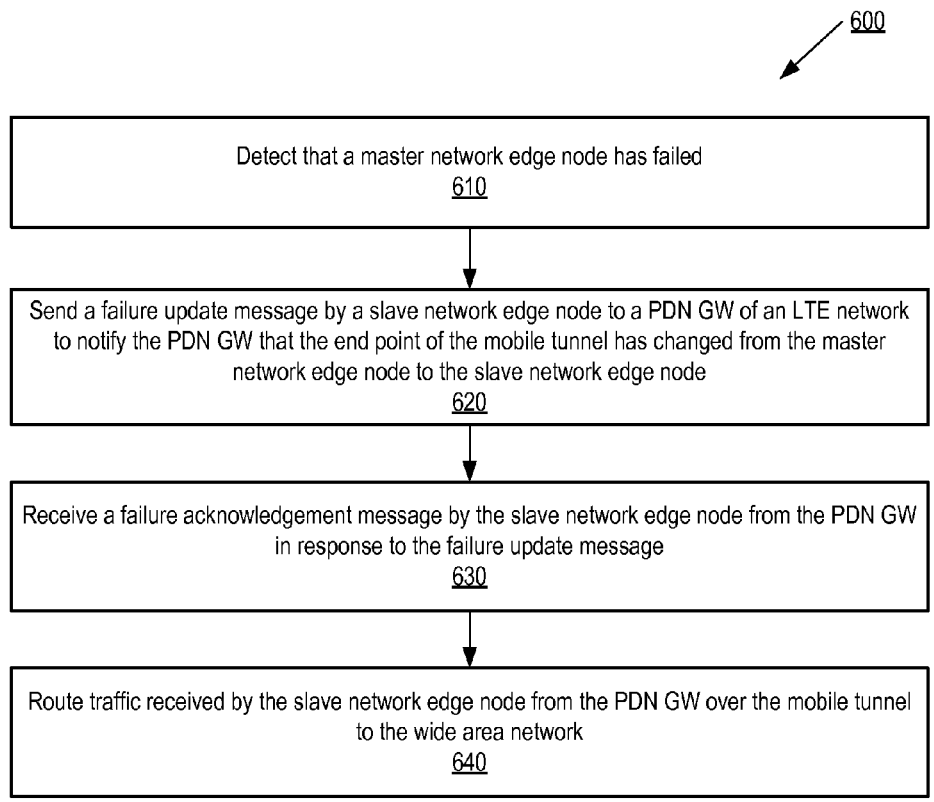
FIG. 6 is a flow diagram illustrating one embodiment of a method for enhancing an LTE backup channel.

FIG. 6 is a flow diagram illustrating a method 600 implemented by a slave network edge node (e.g., BNG2 of FIG. 4) for enhancing an LTE backup channel in the event of a node failure in the wireline network. The slave network edge node provides accessibility to a wide area network for a CPE (e.g., RGW 115 of FIG. 1) upon a failure of a master network edge node (e.g., BNG1 of FIG. 4). BNG1 is coupled to the CPE over a wireline link and provides accessibility to the wide area network for the CPE before the failure. The method begins with BNG2 detecting that BNG1 has failed (block 610). Upon detection of the failure, BNG2 sends a BFU message to a PDN GW (e.g., PDN GW 108) of an LTE network (block 620). The PDN GW provides a backup channel for the CPE to reach the wide area network over a mobile tunnel (e.g., the links 510 and 520). Before the failure the mobile tunnel has an end point at BNG1, and the BFU message notifies the PDN GW that the end point of the mobile tunnel has changed from BNG1 to BNG2. In response to the BFU message, BNG2 receives a BFA message from the PDN GW (block 630).

BNG2 then routes the traffic that it receives from the PDN GW over the mobile tunnel to the wide area network (block 640).

Figure 7:
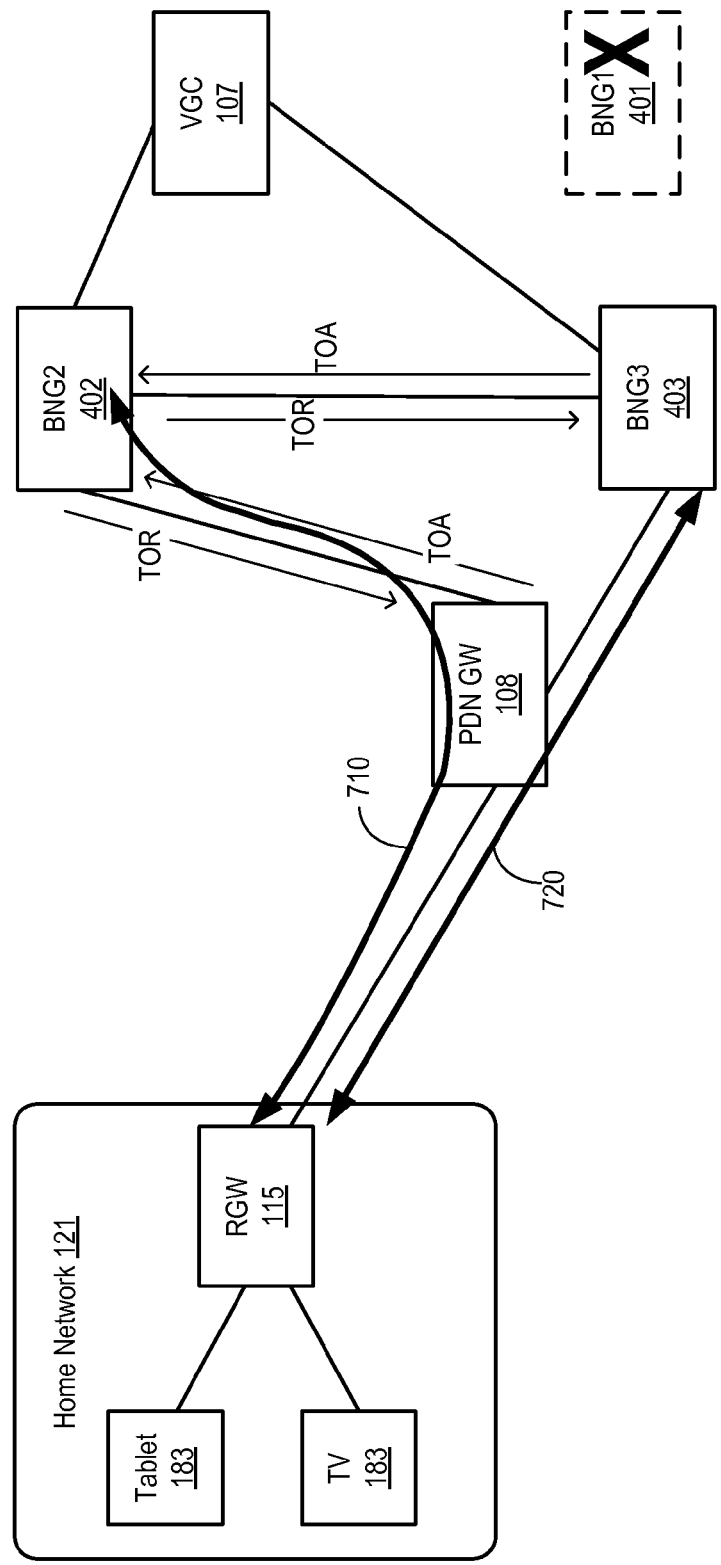
FIG. 7 is a diagram illustrating a dynamic load balancing scenario.

FIG. 7 is a diagram illustrating a dynamic load balancing mechanism according to one embodiment. After BNG1 fails, BNG2 becomes responsible for passing inbound and outbound traffic for RGW 115 over a path 710. However, BNG2 may be serving other customers at the same time and therefore may be overloaded. To alleviate BNG2 of potential traffic congestion, BNG2 may determine to delegate part of the traffic to one or more other BNGs (also referred to as the peer BNGs). To effect this delegation, BNG2 notifies a peer BNG (e.g., BNG3) with a Traffic_Offload_Request (TOR) message, which carries the address of BNG3 and a range of prefixes which need to be offloaded to the receiving node (BNG3). Upon receiving the TOR message, BNG3 sends back a Traffic_Offload_ACK (TOA) message. The size of the prefix range may be determined by BNG2 based on the current traffic load of BNG3. Additionally, BNG2 also notifies PDN GW 108 of the shift in workload from BNG2 to BNG3. The notification to PDN GW 108 indicates the address of BNG3 and the workload (in the form of a prefix range) shifted to BNG3.

Figure 8:
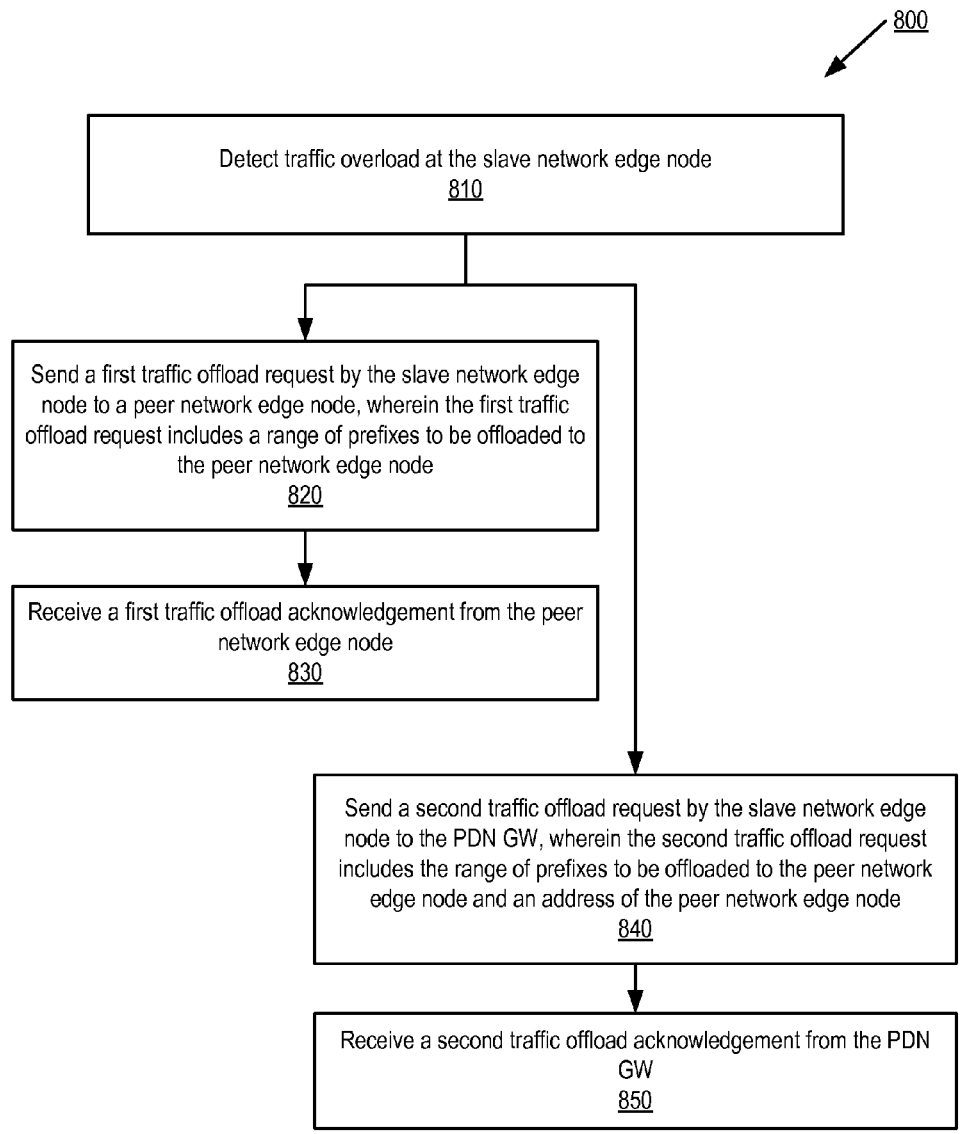
FIG. 8 is a flow diagram illustrating one embodiment of a dynamic load balancing method.

FIG. 8 is a flow diagram illustrating a method 800 implemented by a BNG for performing dynamic load balancing. In one embodiment, the method 800 is performed by a slave network edge node (e.g., BNG2 of FIG. 4) after the master network edge node (e.g., BNG1) fails, and BNG2 has to take over the workload of BNG1 in addition to its normal workload. The method 800 starts with BNG2 detecting that it is overloaded with traffic (block 810). Upon the detection, BNG2 sends a first TOR message to a peer network edge node (e.g., BNG3). The first TOR message includes a range of prefixes to be offloaded to BNG3, such that network traffic identifying an address within the prefix range will be routed by the PDN GW to BNG3 instead of BNG2 (block 820). In response to the first TOR message, BNG2 receives a first TOA message from BNG3 (block 830). In addition, BNG2 sends a second TOR message to the PDN GW (block 840). The second TOR message includes the range of prefixes to be offloaded to BNG3 and an address of BNG3. In response to the second TOR message, BNG2 receives a second TOA message from the PDN GW (block 850).

In one embodiment, a BNG may shift its workload to a peer BNG where the shifting of workload is not triggered by the failure of another BNG (e.g., BNG1). In the example of FIG. 7, BNG2 may shift its workload to BNG3 during normal operation even though BNG is working normally. The operation of BNG2 for shifting workload when BNG1 is working can be the same as the operation described in FIG. 8.

In one embodiment, a BNG may shift its workload to more than one peer BNG. The amount of workload shifted to each BNG may be different and may be dependent upon the current workload of each BNG. The amount of shifted workload is reflected in the size of the prefix range sent to each BNG. The BNGs may periodically exchanges messages indicating their respective current workload. Alternatively, the BNGs may be coupled to a centralized entity (e.g., one or more VGCs) and the centralized entity keeps track of the capacity and current workload of the BNGs. When BNG2 detects that it is overloaded with traffic, BNG2 may obtain the information of the current workload and/or available capacity from the centralized entity, and to thereby determine the amount of workload to be shifted to its peer BNGs.

The operations of the flow diagrams of FIGS. 6 and 8 will be described with reference to the exemplary embodiment of FIGS. 1, 2, 3A and 3B. However, it should be understood that the operations of flow diagrams can be performed by embodiments of the invention other than those discussed with reference to FIGS. 1, 2, 3A and 3B, and the embodiments discussed with reference to FIGS. 1, 2, 3A and 3B can perform operations different than those discussed with reference to the flow diagrams of FIGS. 6 and 8. While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a slave network edge node at an edge of a service provider network, the slave network edge node to provide accessibility to a wide area network for a customer premise equipment (CPE) upon a failure of a master network edge node, wherein the master network edge node is coupled to the CPE over a wireline link and provides accessibility to the wide area network for the CPE before the failure, the method comprising:
   detecting that the master network edge node has failed;
   sending a failure update message (BFU) by the slave network edge node to a Packet Data Network Gateway (PDN GW) of a Long-Term Evolution (LTE) network, wherein the PDN GW provides a backup channel for the CPE to reach the wide area network over a mobile tunnel, and wherein before the failure the mobile tunnel has an end point at the master network edge node, and wherein the failure update message notifies the PDN GW that the end point of the mobile tunnel has changed from the master network edge node to the slave network edge node;
   receiving a failure acknowledgement message (BFA) by the slave network edge node from the PDN GW in response to the failure update message; and
   routing traffic received by the slave network edge node from the PDN GW over the mobile tunnel to the wide area network.

2. The method of claim 1, wherein detecting that the master network edge node has failed further comprises: detecting an absence of a keep-alive message from the master network edge node.

3. The method of claim 2, further comprising: periodically exchanging a state of a second virtual gateway controller in the slave network edge node with a state of a first virtual gateway controller in the master network edge node until the failure of the master network edge node is detected, wherein the first virtual gateway controller and the second virtual gateway controller are adapted to perform control functions for the CPE.

4. The method of claim 1, wherein detecting that the master network edge node has failed further comprises: exchanging keep-alive messages with the master network edge node and a virtual gateway controller, wherein the virtual gateway controller is coupled to both the master network edge node and the slave network edge node to perform control functions for the CPE.

5. The method of claim 3, further comprising: notifying the virtual gateway controller that the end point of the mobile tunnel has changed from the master network edge node to the slave network edge node upon detecting the failure of the master network edge node.

6. The method of claim 1, further comprising:
   detecting traffic overload at the slave network edge node;
   sending a first traffic offload request (TOR) by the slave network edge node to a peer network edge node, wherein the first traffic offload request includes a range of prefixes to be offloaded to the peer network edge node, such that network traffic identifying an address within the range is to be routed by the PDN GW to the peer network edge node instead of the slave network edge node; and
   receiving a first traffic offload acknowledgement (TOA) from the peer network edge node.

7. The method of claim 6, wherein sending the first traffic offload request further comprises:
   sending a second traffic offload request by the slave network edge node to the PDN GW, wherein the second traffic offload request includes the range of prefixes to be offloaded to the peer network edge node and an address of the peer network edge node; and
   receiving a second traffic offload acknowledgement from the PDN GW by the slave network edge node.

8. The method of claim 6, wherein sending the first traffic offload request further comprises: determining the range of prefixes based on a current workload of the peer network edge node.

9. A network element serving as a slave network edge node at an edge of a service provider network, the network element to provide accessibility to a wide area network for a customer premise equipment (CPE) upon a failure of a master network edge node, wherein the master network edge node is coupled to the CPE over a wireline link and provides accessibility to the wide area network for the CPE before the failure, the network element comprising:
   an uplink module to communicate with the wide area network;
   a master/slave interface module to communicate with the master network edge node;
   a Packet Data Network Gateway (PDN GW) interface module to communicate with a PDN GW of a Long-Term Evolution (LTE) network, wherein the PDN GW provides a backup channel for the CPE to reach the wide area network over a mobile tunnel, and wherein before the failure the mobile tunnel has an end point at the master network edge node; and
   a network processor communicatively coupled to the uplink module, the master/slave interface module, and the PDN GW interface module, the network processor adapted to:
      detect that the master network edge node has failed;
      send a failure update message (BFU) to the PDN GW, wherein the failure update message notifies the PDN GW that the end point of the mobile tunnel has changed from the master network edge node to the slave network edge node;
      receive a failure acknowledgement message (BFA) from the PDN GW in response to the failure update message; and
      route traffic received from the PDN GW over the mobile tunnel to the wide area network.

10. The network element of claim 9, wherein the network processor is further adapted to detect an absence of a keep-alive message from the master network edge node.

11. The network element of claim 10, wherein the network processor is further adapted to periodically exchange a state of a second virtual gateway controller in the slave network edge node with a state of a first virtual gateway controller in the master network edge node until the failure of the master network edge node is detected, wherein the first virtual gateway controller and the second virtual gateway controller are adapted to perform control functions for the CPE.

12. The network element of claim 9, wherein the network processor is further adapted to exchange keep-alive messages with the master network edge node and a virtual gateway controller, wherein the virtual gateway controller is coupled to both the master network edge node and the slave network edge node to perform control functions for the CPE.

13. The network element of claim 12, wherein the network processor is further adapted to notify the virtual gateway controller that the end point of the mobile tunnel has changed from the master network edge node to the slave network edge node upon detecting the failure of the master network edge node.

14. The network element of claim 9, wherein the network processor is further adapted to:
  detect traffic overload at the slave network edge node;
  send a first traffic offload request (TOR) by the slave network edge node to a peer network edge node, wherein the first traffic offload request includes a range of prefixes to be offloaded to the peer network edge node, such that network traffic identifying an address within the range is to be routed by the PDN GW to the peer network edge node instead of the slave network edge node; and
  receive a first traffic offload acknowledgement (TOA) from the peer network edge node.

15. The network element of claim 14, wherein the network processor is further adapted to:
  send a second traffic offload request by the slave network edge node to the PDN GW, wherein the second traffic offload request includes the range of prefixes to be offloaded to the peer network edge node and an address of the peer network edge node; and
  receive a second traffic offload acknowledgement from the PDN GW by the slave network edge node.

16. The network element of claim 14, wherein the network processor is further adapted to determine the range of prefixes based on a current workload of the peer network edge node.

17. The network element of claim 9, wherein the slave network edge node is a slave Broadband Network Gateway (BNG), and the master network edge node is a master BNG, and the CPE is a Residential Gateway (RGW).

18. A slave Broadband Network Gateway (BNG) in a service provider network to provide accessibility to a wide area network for a Residential Gateway (RGW) upon a failure of a master BNG, the slave BNG comprising:
  an uplink module to communicate with the wide area network;
  a master/slave interface module to communicate with the master BNG, the master BNG coupled to the RGW over a wireline link;
  a Packet Data Network Gateway (PDN GW) interface module to communicate with a PDN GW of a Long-Term Evolution (LTE) network, wherein the PDN GW provides a backup channel for the RGW to reach the wide area network over a mobile tunnel, and wherein before the failure the mobile tunnel has an end point at the master BNG; and
  a network processor communicatively coupled to the uplink module, the master/slave interface module, and the PDN GW interface module, the network processor adapted to:
    detect that the master BNG has failed;
    send a failure update message (BFU) to the PDN GW, wherein the failure update message notifies the PDN GW that the end point of the mobile tunnel has changed from the master BNG to the slave BNG;
    receive a failure acknowledgement message (BFA) from the PDN GW in response to the failure update message; and
    route traffic received from the PDN GW over the mobile tunnel to the wide area network.

19. A method implemented by a first network edge node at an edge of a service provider network for dynamically balancing network traffic load among a plurality of peer network edge nodes, the first network edge node to provide accessibility to a wide area network for a customer premise equipment (CPE), the method comprising:
  detecting traffic overload at the first network edge node;
  sending a first traffic offload request (TOR) by the first network edge node to a peer network edge node, wherein the first traffic offload request includes a range of prefixes to be offloaded to the peer network edge node, such that network traffic identifying an address within the range is to be routed by a Packet Data Network Gateway (PDN GW) of a Long-Term Evolution (LTE) network to the peer network edge node instead of the first network edge node, wherein the PDN GW provides a backup channel for the CPE to reach the wide area network over a mobile tunnel; and
  receiving a first traffic offload acknowledgement (TOA) from the peer network edge node.

20. The method of claim 19, wherein sending the first traffic offload request further comprises:
  sending a second traffic offload request by the first network edge node to the PDN GW, wherein the second traffic offload request includes the range of prefixes to be offloaded to the peer network edge node and an address of the peer network edge node; and
  receiving a second traffic offload acknowledgement from the PDN GW by the first network edge node.

21. The method of claim 19, wherein sending the first traffic offload request further comprises: determining the range of prefixes based on a current workload of the peer network edge node.

22. The method of claim 19, further comprising:
  receiving an indication of current workload from each of the plurality of peer network edge nodes; and
  identifying the peer edge nodes that have capacity to support workload shifted from the first network edge node.

23. The method of claim 22, wherein the step of identifying the peer edge nodes further comprises: exchanging current workload information among the first network edge node and the peer edge nodes.

24. The method of claim 22, wherein the step of identifying the peer edge nodes further comprises: receiving current workload information from one or more virtual gateway controllers coupled to the first network edge node and the peer edge nodes.

25. A network element serving as a first network edge node at an edge of a service provider network for dynamically balancing network traffic load among a plurality of peer network edge nodes, the first network edge node to provide accessibility to a wide area network for a customer premise equipment (CPE), the network element comprising:
  an uplink module to communicate with the wide area network;
  a BNG interface module to communicate with the peer network edge nodes;

a Packet Data Network Gateway (PDN GW) interface module to communicate with a PDN GW of a Long-Term Evolution (LTE) network, wherein the PDN GW provides a backup channel for the CPE to reach the wide area network over a mobile tunnel; and a network processor communicatively coupled to the uplink module, the BNG interface module, and the PDN GW interface module, the network processor adapted to:

detect traffic overload at the first network edge node;

send a first traffic offload request (TOR) by the first network edge node to a peer network edge node, wherein the first traffic offload request includes a range of prefixes to be offloaded to the peer network edge node, such that network traffic identifying an address within the range is to be routed by the PDN GW to the peer network edge node instead of the first network edge node; and receive a first traffic offload acknowledgement (TOA) from the peer network edge node.

* * * * *